United States Patent [19]

Takano

[11] Patent Number: 5,393,212

[45] Date of Patent: Feb. 28, 1995

[54] NOODLE MAKING MACHINE WITH A PLURALITY OF INTERCHANGEABLE FEED UNITS

[75] Inventor: Kazuhiko Takano, Kounosu, Japan

[73] Assignee: Sanyo Electric Co., Ltd., Osaka, Japan

[21] Appl. No.: 53,151

[22] Filed: Apr. 26, 1993

[30] Foreign Application Priority Data

Apr. 30, 1992 [JP] Japan .................................. 4-137733

[51] Int. Cl.6 ...................... A21C 01/06; A21C 03/02; A21C 03/10
[52] U.S. Cl. .................................... 425/186; 425/194; 425/209; 425/239; 425/296; 425/302.1; 425/308; 425/363; 425/447; 426/502; 426/503
[58] Field of Search ............... 425/169, 173, 186, 189, 425/194, 209, 238, 239, 240, 241, 296, 363, 302.1, 308, 447; 426/502, 503, 504

[56] References Cited

U.S. PATENT DOCUMENTS

| | | | |
|---|---|---|---|
| 2,223,351 | 12/1940 | DeFrancisci | 425/189 |
| 3,712,775 | 1/1973 | Duker | 425/186 |
| 3,773,448 | 11/1973 | Poot | 425/241 |
| 4,302,173 | 11/1981 | Persson | 425/239 |
| 5,158,782 | 10/1992 | Hayashi et al. | 425/135 |

FOREIGN PATENT DOCUMENTS

| | | |
|---|---|---|
| 61-85159 | 4/1986 | Japan . |
| 3-201956 | 9/1991 | Japan . |

*Primary Examiner*—Jay H. Woo
*Assistant Examiner*—Joseph Leyson
*Attorney, Agent, or Firm*—Darby & Darby

[57] ABSTRACT

A quantitative flour feeding unit of a noodle making machine which can easily be exchanged with another one for making a different kind of noodle using a different kind of flour including a support platform on which a hopper and a rotational driving mechanism are mounted to quantitatively feeding the flour stored in the hopper to a flour kneading unit. The support platform is removably mounted on a housing of the noodle making machine by a position determining unit to enable the exchange with the position determining unit including a V-shaped groove formed at one corner of the support platform and a stationary knob disposed on the support platform at another diametrically located platform corner. The noodle making machine has a unit for transmitting the power generated by a motor to the rotational driving mechanism and a unit for setting and indicating what kind of flour is being used at present.

6 Claims, 16 Drawing Sheets

NOODLE MAKING MACHINE WITH A PLURALITY OF INTERCHANGEABLE FEED UNITS

BACKGROUND OF THE INVENTION

1. Field of the Invention

The present invention relates generally to an automatic noodle making machine. More particularly, the present invention relates to improvement of a noodle making machine for automatically producing noodles such as "wheat vermicelli", "buck-wheat vermicelli", "Chinese vermicelli" or the like.

2. Background Art

In recent years, many requests have been raised from users for providing a noodle making machine which assures that plural kinds of noodles can be produced with a single noodle making machine.

A conventional noodle making machine of the foregoing type is constructed as disclosed in an official gazette of Japanese Patent Laid-Open Publication NO. 3-201956 filed by a common applicant to the present invention.

According to this prior invention, the noodle making machine is equipped with a quantitative flour feeding unit which is fixedly mounted on a housing of the noodle making machine and includes a hopper for storing flour and a rotational driving mechanism for driving the quantitative flour feeding unit.

With this construction, when a different kind of flour is used for producing a different kind of noodle, it is necessary that the flour remaining in the hopper after completion of the preceding noodle making operation is removed from the hopper. To this end, for example, the flour remaining in an upper storing section of the hopper is scooped from the hopper by a hand ladle, while the flour remaining in a lower storing section of the hopper is discharged from the hopper by idly driving a rotational driving mechanism in the quantitative flour feeding unit. However, such a flour discharging operation of unwanted flour as mentioned above requires much time.

To obviate the foregoing problem, a proposal has been made with respect to a noodle making machine as disclosed in an official gazette of Japanese Patent Laid-Open Publication NO. 61-85159 wherein the noodle making machine includes a plurality of flour storing units which are mounted on a housing of the noodle making machine such that one of the flour storing units is selectively exchanged with another one when a different kind of flour is used for producing a different kind of noodle. However, it has been pointed out as problems that the proposed noodle making machine is unavoidably constructed with large dimensions, causing it to be manufactured at an expensive cost and that some of the flour storing units are not necessary for all users.

SUMMARY OF THE INVENTION

The present invention has been made in consideration of the aforementioned background.

An object of the present invention is to provide a noodle making machine which assures that one of a plurality of quantitative flour feeding units each having a different kind of flour stored therein can exchangeably be mounted on a housing of the noodle making machine as desired.

Another object of the present invention is to provide a noodle making machine which assures that quantitative flour feeding units each including a hopper and a rotational driving mechanism can easily be mounted on or dismounted from the housing of the noodle making machine.

A further object of the present invention is to provide a noodle making machine which includes a flour kind discriminating unit adapted to indicate what kind of flour is being used.

The present invention provides a noodle making machine of the type including a quantitative flour feeding unit mounted on a housing of the noodle making machine for quantitatively feeding flour stored in a hopper with the aid of a rotational driving mechanism, a flour kneading unit for preparing a scrambled egg-shaped noodle base by kneading the flour fed from the quantitative flour feeding unit in the presence of kneading water, a noodle base milling unit for milling the noodle base prepared in the flour kneading unit to prepare a noodle band, and a noodle band cutting unit for cutting the noodle band into a plurality of ribbon-shaped noodles with the aid of an opposing pair of cutting rollers. In accordance with the invention, the quantitative flour feeding units includes a support platform on which the hopper and the rotational driving mechanism are mounted, the support platform being removably mounted on the housing of the noodle making machine with the aid of position determining means so as to enable quantitative flour feeding units to be exchanged for making a different kind of noodle using a different kind of flour.

The position determining means is composed of a V-shaped groove formed at one corner of the support platform so as to allow a locating pin projecting upward of a ceiling plate of the housing to be engaged with the V-shaped groove and a stationary knob disposed on the support platform at another corner of the support platform diametrically located opposite to the first-mentioned corner.

The stationary knob includes a male-threaded portion adapted to be threadably engaged with a female-threaded hole formed through the ceiling plate of the housing.

The noodle making machine is additionally equipped with a power transmitting unit for transmitting the power generated by a driving motor to the rotational driving mechanism.

The power transmitting unit is composed of a driving gear fixedly fitted onto an output shaft of the driving motor and a driven gear disposed at the lower end of the rotational driving mechanism.

In addition, the noodle making machine is additionally equipped with a unit for setting and indicating what kind of flour is used at the present. The unit is disposed on the support platform of the quantitative flour feeding unit and comprises a plurality of display marks each formed on the support platform for indicating the kind of flour used at present, a flour kind selecting lever slidably disposed on the support platform and a plurality of microswitches each disposed on the ceiling plate of the housing.

With this construction, since a quantitative flour feeding unit having a certain kind of flour stored therein is removably mounted on the support platform with the aid of the position determining unit so as to enable it to be exchanged with another one for making a different kind of noodle using a different kind of flour, mounting and dismounting of each quantitative flour feeding unit can easily be achieved while a certain quantity of flour remains still in the hopper.

Other objects, features and advantages of the present invention will become more apparent from reading of the following description which has been made in conjunction of the accompanying drawings.

BRIEF DESCRIPTION OF THE DRAWINGS

The present invention is illustrated in the following drawings in which.

DETAILED DESCRIPTION OF THE PREFERRED EMBODIMENTS

The present invention will now be described in detail hereinafter with reference to the accompanying drawings which illustrate a preferred embodiment.

Figure 1:
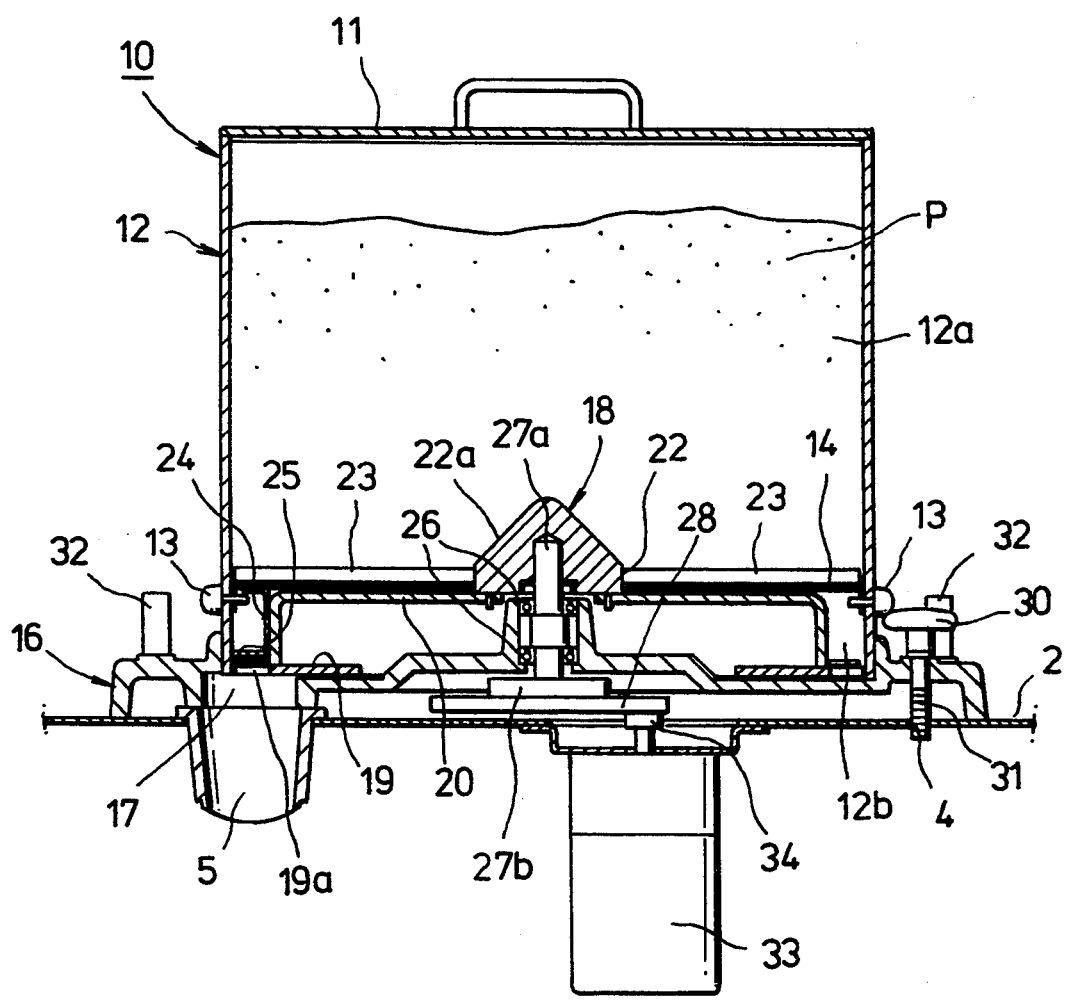
FIG. 1 is a vertical sectional view of a quantitative flour feeding unit for an automatic noodle making machine constructed according to an embodiment of the present invention, particularly showing in an enlarged scale that the quantitative flour feeding unit is mounted on a housing of the noodle making machine.
Figure 2:
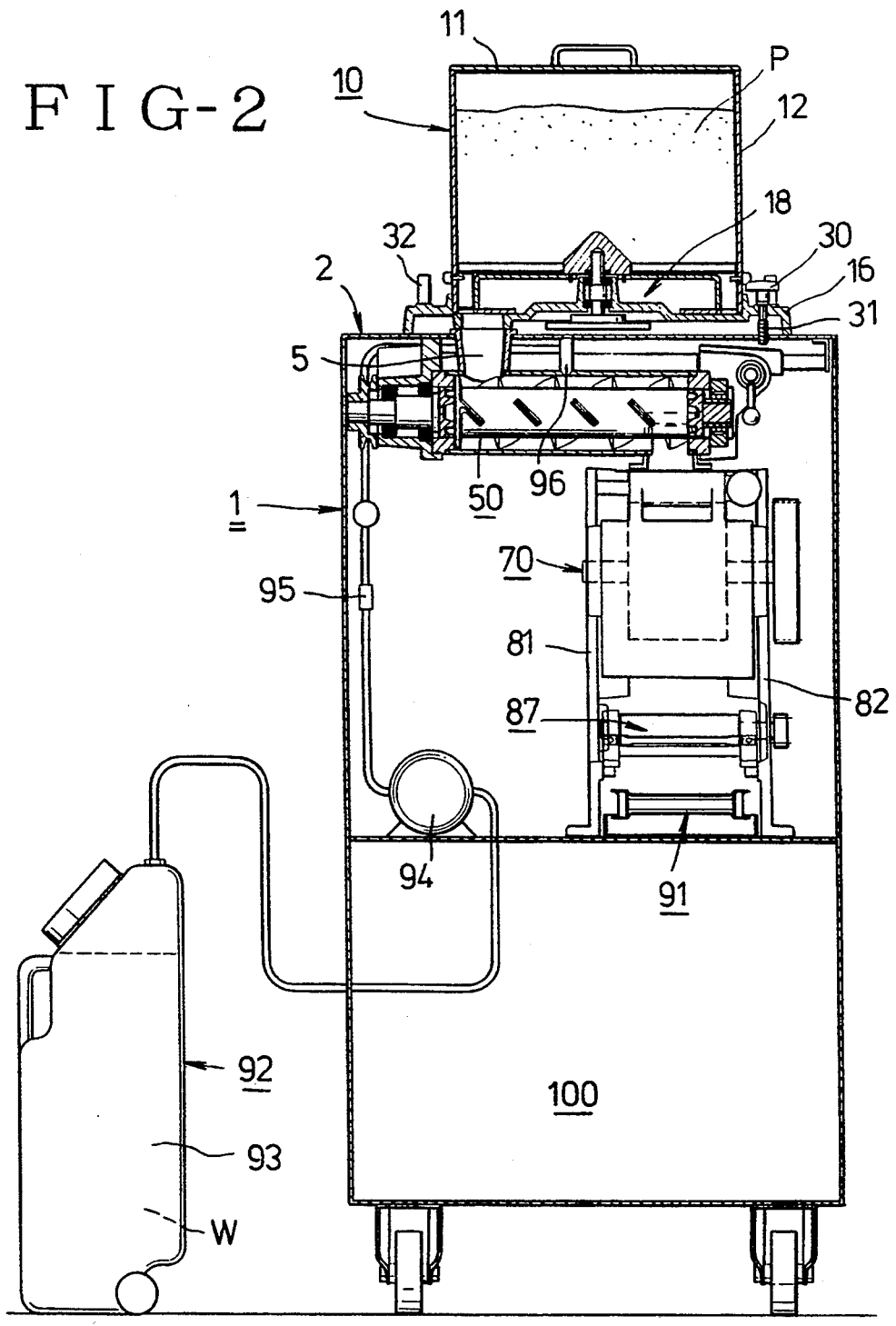
FIG. 2 is a vertical sectional front view of the automatic noodle making machine, schematically showing the whole structure of the automatic noodle making machine.
Figure 3:
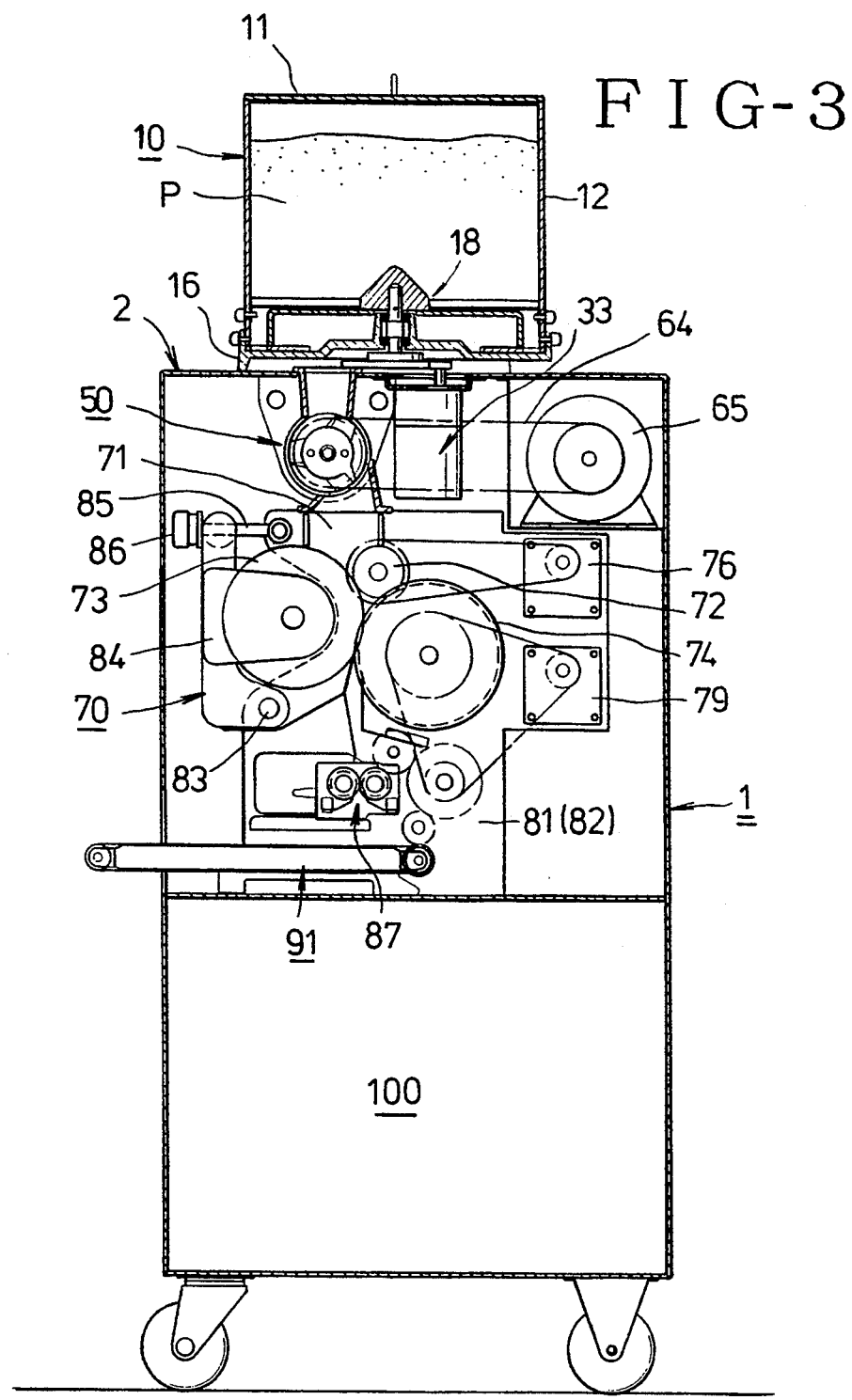
FIG. 3 is a vertical sectional side view of the automatic noodle making machine, schematically showing the whole structure of the automatic noodle making machine.
Figure 4:
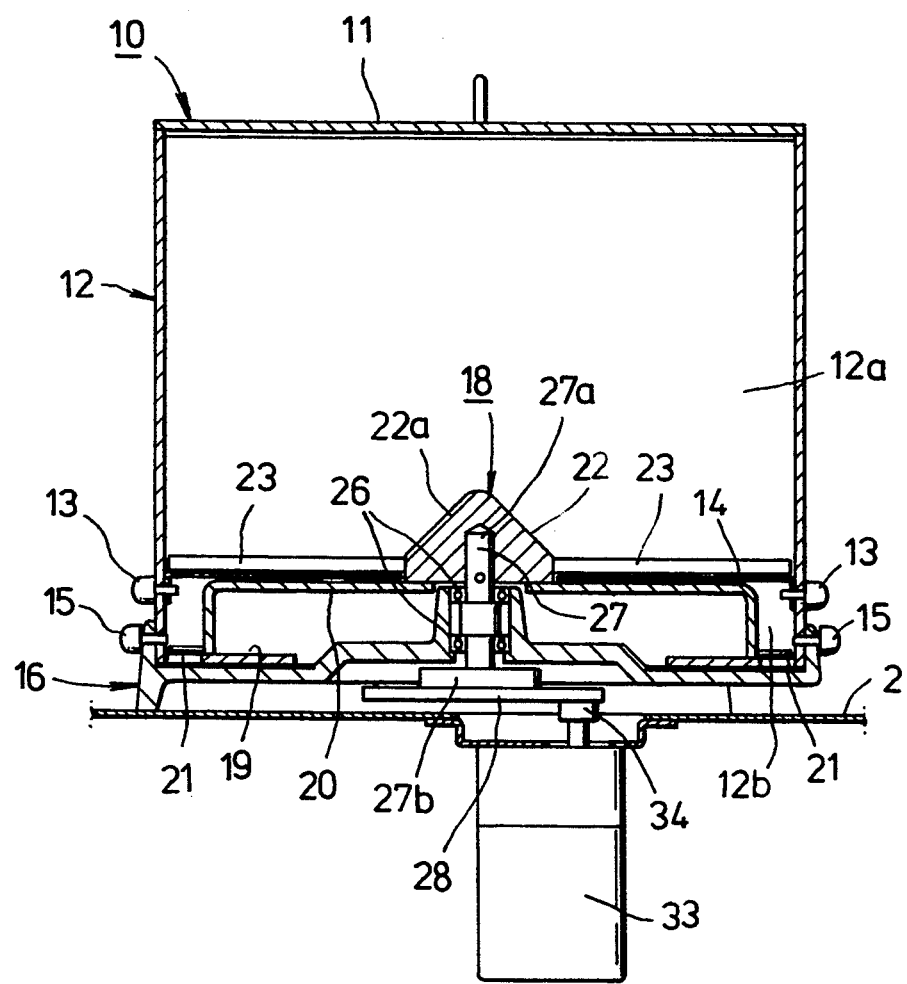
FIG. 4 is a vertical sectional side view of the quantitative flour feeding unit, particularly showing essential components forming the quantitative flour feeding unit in an enlarged scale.

Among the drawings, FIG. 2 and FIG. 3 show by way of sectional views the complete structure of a noodle making machine constructed according to an embodiment of the present invention. In the drawings, reference numeral 1 designates a housing of the noodle producing machine.

The housing 1 includes a ceiling plate 2 on which a quantitative flour feeding unit 10 is mounted in which flour P is stored.

As shown in FIG. 1 and FIG. 4 to FIG. 6, the quantitative flour four feeding unit 10 includes a transparent cylindrical hopper 12 covered with a lid plate 11, a partition plate 14 fastened to the hopper 12 by tightening a plurality of screws 13 for separatively dividing the hopper 12 into an upper storing section 12a and a lower storing section 12b, a support platform 16 to which the bottom of the lower storing section 12b of the hopper 12 is fastened by tightening a plurality of screws 15, and a rotational driving mechanism 18 mounted on the support platform 16 for feeding flour P stored in the lower storing section 12b into a mixer 51 arranged in a flour kneading unit 50 via a flour outfeed port 17. These components are removably assembled together to form the quantitative flour feeding unit 10. The mixer 51 in the flour kneading unit 50 will later be described in detail.

The partition plate 14 is intended to prevent the density of flour P from varying when the dead weight of flour P stored in the upper storing section 12a is exerted directly on the flour P stored in the lower storing section 12b, and a plurality of holes 14a are formed through the partition plate 14 around the peripheral part of the same so as to allow the flour P stored in the upper storing section 12 to fall down in the lower storing section 12b through the holes 14a.

A rotational driving mechanism 18 for quantitatively feeding the flour P stored in the upper storing section 12a to the mixer 51 includes an annular slide plate 19 made of a sheet of stainless steel and detachably attached to the bottom surface of the support platform 16 with a flour outfeed port 19a formed thereon corresponding to the flour outfeed port 17, a rotary member 20 slidably arranged on the slide plate 19, a plurality of rotary fingers 21 each composed of a leaf spring of stainless steel and arranged in the equally spaced relationship as seen in the circumferential direction with a flour receiving portion 21 having a predetermine area formed between adjacent rotary fingers 21 while projecting outward of the rotary member 20, a stirring member 22 detachably arranged at the central part of the rotary member 20 with a head 22a located in the upper storing section 12a of the hopper 12 to rotate in synchronization with the rotary member 20, a plurality of stirring rods 23 (three stirring rods in the shown embodiment) projecting outward of the head 22a of the stirring member 22 to stir the flour P stored in the upper storing section 12a above the partition plate 14, and a cover plate 24 located above the rotary fingers 21 at the position corresponding to the flour outfeed port 17 formed on the support platform 16.

The cover plate 24 is intended to prevent the flour P stored in the lower storing section 12b from falling down directly through the flour outfeed port 17, and a part of the cover plate 24 is bent in the downward direction to form a projection 25 adapted to successively come in contact with the rotary fingers 21, each composed of a leaf spring, when each rotary finger 21 passes past the flour outfeed port 17.

The rotary member 20 of the rotational driving mechanism 18 is rotatably supported by bearings 26 received in the central part of the support platform 16, and the rotational force generated by a first driving motor 33 is transmitted to the stirring member 22 detachably fitted onto an upper end 27a of a rotational shaft 27. A lower end 27b of the rotational shaft 27 projects downward of the support platform 16 so that a follower gear 28 fitted onto the lower end 27b of the rotational shaft 27 meshes with a driving gear 34 of the first driving motor 33 serving as power transmitting means to be described later.

A V-shaped guide groove 29 serving as position determining means is formed at one corner of the support platform 16, and a locating pin 3 projecting upward of the ceiling plate 2 of the housing 1 is brought in engagement with the V-shaped guide groove 29.

A stationary knob 30 is disposed on the support platform 16 at another corner of the support platform 16 diametrically located opposite to the foregoing corner of the same, and a male-threaded portion 31 of the stationary knob 30 is threadably engaged with a female-threaded hole 4 formed through the ceiling plate 2 of the housing 1.

In the drawings, reference numerals 32 designate a pair of handles. The quantitative flour feeding unit 10 constructed in the above-described manner can manually be raised up by seizing the handles 32 with the operator's hands.

The first driving motor 33 is fixedly secured to the lower surface of the ceiling plate 2 of the housing 1, and the driving gear 34 of the first driving motor 33 projects above the ceiling plate 2 of the housing 1.

When the quantitative flour feeding unit 10 is mounted on the ceiling plate 2 of the housing 1, first, the support platform 16 is raised up by seizing the handles 32 with operator's hands and it is then placed on the ceiling plate 2 of the housing 1.

Subsequently, the locating pin 3 standing upright from the ceiling plate 2 of the housing 1 is engaged with the V-shaped guide groove 29 formed on the support platform 16 and the male-threaded portion 31 of the stationary knob 30 is then threadably engaged with the female-threaded hole 4 formed through the ceiling plate 2 of the housing 1, whereby the quantitative flour feeding unit 10 is removably mounted in position on the ceiling plate 2 of the housing 1, and at the same time, the follower gear 28 fixedly mounted on the rotational shaft 27 of the driving mechanism 18 meshes with the driving gear 34 of the first driving motor 33.

As the first driving motor 33 rotates, the rotary member 20 and the stirring member 22 of the rotational driving mechanism 18 are rotated in synchronization with the first driving motor 33 via the rotational shaft 27 so that the flour P stored in the upper storing section 12a located above the partition plate 14 of the hopper 12 falls down in the lower storing section 12b through the holes 14a formed through the partition plate 14 around the peripheral part of the same to enter the flour receiving portion 21a formed between adjacent rotary fingers 21 while it is stirred by the stirring rods 23 radially extending from the head 22a of the stirring member 22.

Figure 7:
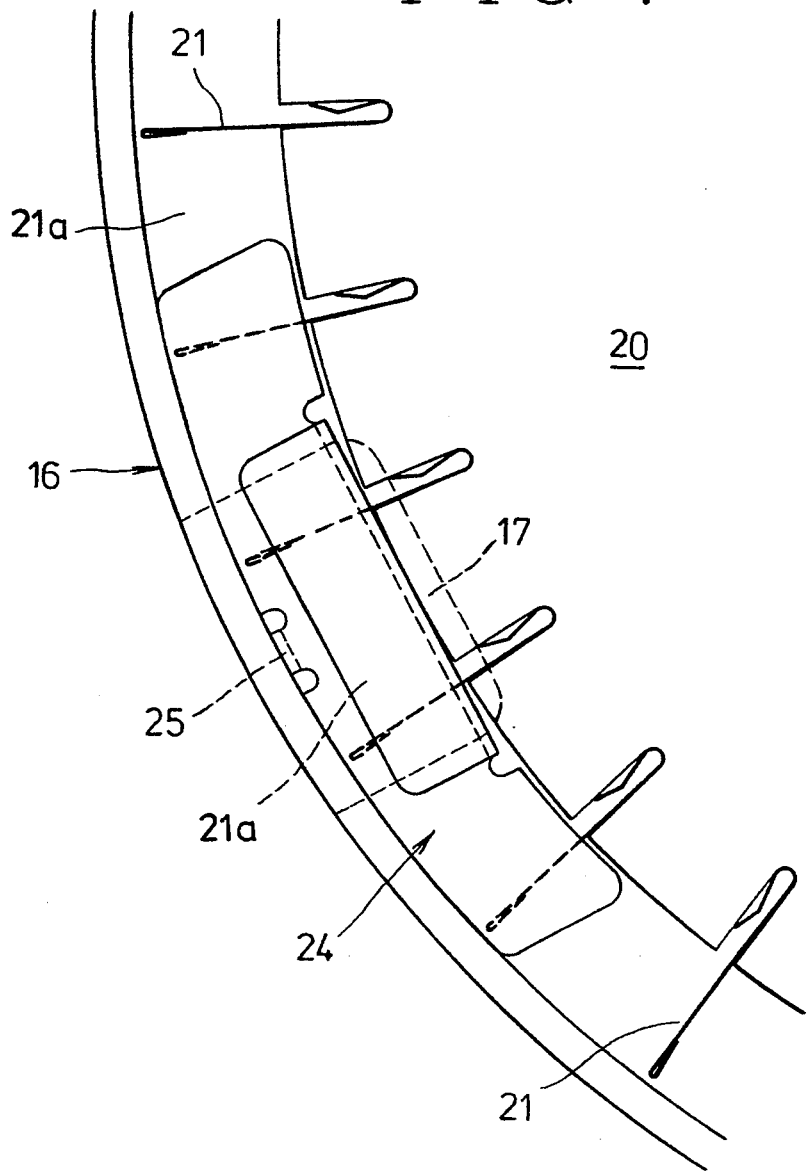
FIG. 7 is a fragmentary enlarged plan view of the quantitative flour feeding unit, particularly showing a few essential components forming the quantitative flour feeding unit.

As shown in FIG. 7, the flour P received in the flour receiving portion 21a in that way is rotationally displaced on the slide plate 19 placed on the bottom plane of the support platform 16 as the rotatory member 20 is rotated. When the flour P reaches the outfeed port 19a on the slide plate 19, it falls down through the outfeed port 17 by its own dead weight so that it is quantitatively fed into the mixer 51 of the flour kneading unit 50 via the flour outfeed port 17 on the support platform 16 located corresponding to the flour outfeed port 19a and a chute 5 disposed on the ceiling plate 2 of the housing 1.

As the rotary member 20 is rotated, the rotary fingers 21, each formed of a leaf spring are successively brought in contact with the projection 25 of the cover plate 24 to deflect at the substantially same time when the flour P falls down through the outfeed port 19a of the slide plate 19. Subsequently, as the rotary member 20 is rotated further, the rotary fingers 21 are resiliently released from the deflected state induced by the projection 25 of the cover plate 24, causing the rotary fingers 21 to vibrate. Consequently, the flour P received in the flour receiving portion 21a defined by the adjacent rotary fingers 21 and the outer periphery of the rotary member 20 is completely directed away from the rotary fingers 21 so that it is fed into the mixer 51 of the flour kneading unit 50 at a high accuracy in respect of a quantity of fed flour.

In the shown embodiment, the quantity of feeding of flour P into the mixer 51 of the flour kneading unit 50 can adjustably be determined depending on the number of flour receiving portions 21a each passing past the outfeed port 19a on the slide plate 19 as the rotary member 20 is rotated, on the assumption that the quantity of flour P received in a single flour receiving portion 21a is taken as a unit.

Thus, a predetermined quantity of flour P can be fed into the mixer 51 of the flour kneading unit 50, provided that a rotating time of the rotary member 20 is preset by a timer (not shown) and a predetermined number of flour receiving portions 21a successively reach the outfeed port 19a of the slide plate 19.

Alternatively, a predetermined quantity of flour P can be fed into the mixer 51 of the flour kneading unit 50 by employing a process wherein circumferential displacement of each flour receiving portion 21a caused by rotation of the rotary member 20 is detected by a sensor (not shown) so as to enable the number of flour receiving portions 21a which successively reach the flour outfeed port 19a of the slide plate 19 as the rotary member 20 is rotated to be preset.

Figure 5:
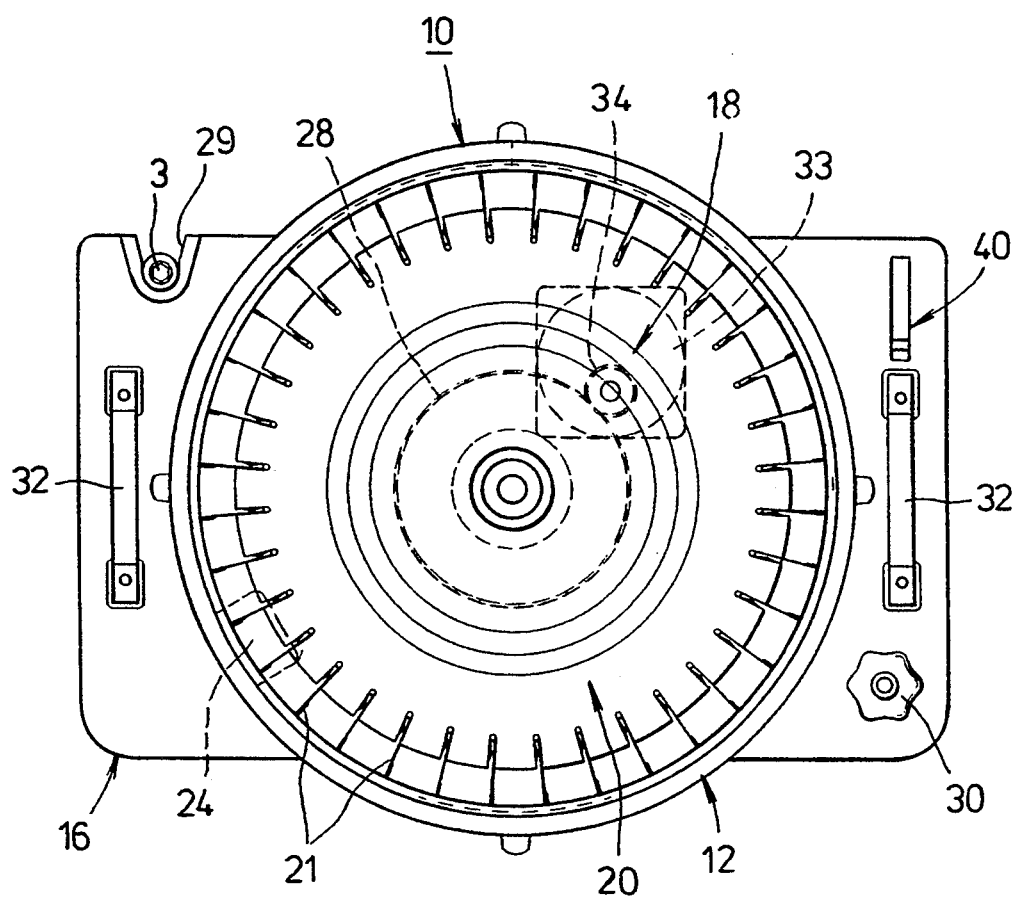
FIG. 5 is a sectional plan view of the quantitative flour feeding unit, particularly showing essential components forming the quantitative flour feeding unit in an enlarged scale.
Figure 6:
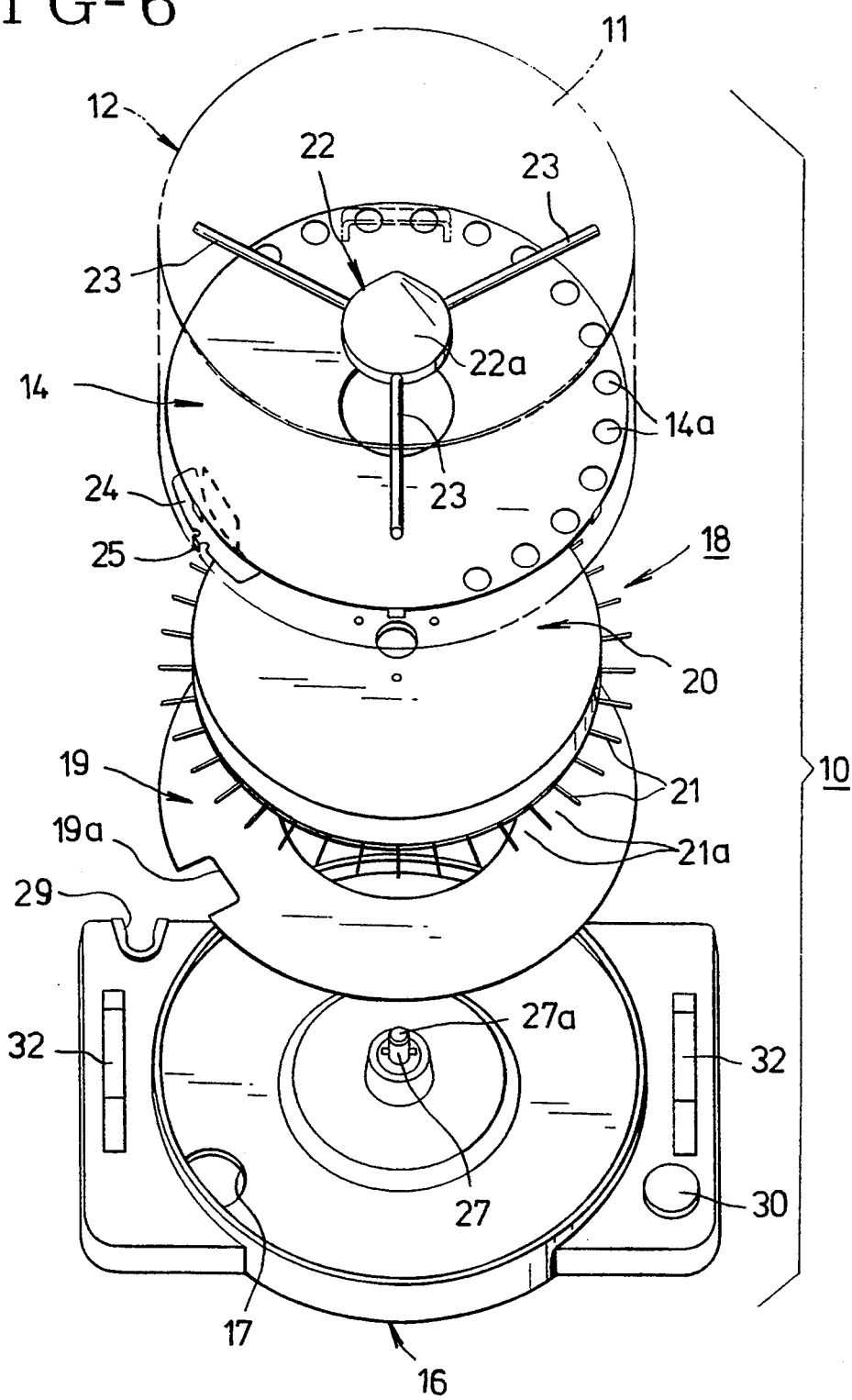
FIG. 6 is a perspective view of the quantitative flour feeding unit, particularly showing several essential components constituting the quantitative flour feeding unit in the disassembled state.

In FIG. 5, reference numeral 40 designates a flour kind setting unit which is disposed on the support platform 16 of the quantitative flour feeding unit 10 to select and indicate what kind of flour P is used at present. Specifically, as shown in FIG. 8 to FIG. 11, the flour kind discriminating unit 40 includes a plurality of display marks A, B, C and D (four display marks in the shown embodiment) formed on the support platform 16 for displaying the kind of flour P, a flour kind selecting lever 41 slidably disposed on the support platform 16 to move to one of the display marks A, B, C and D, and first and second microswitches 42 and 43 disposed on the ceiling plate 2 of the housing 1 to serve as flour kind detecting means. A guide roller is attached to the top of each of the first and second microswitches 42 and 43.

Figure 8:
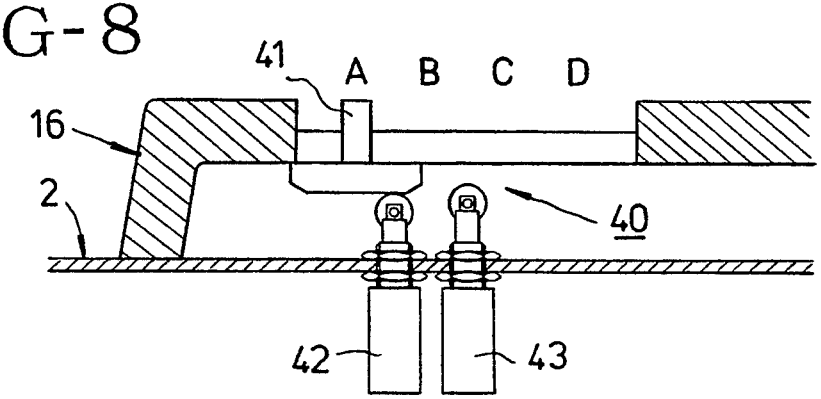
FIG. 8 is an illustrative view of a flour kind discriminating unit, particularly showing that the kind of flour used at present is indicated.
Figure 9:
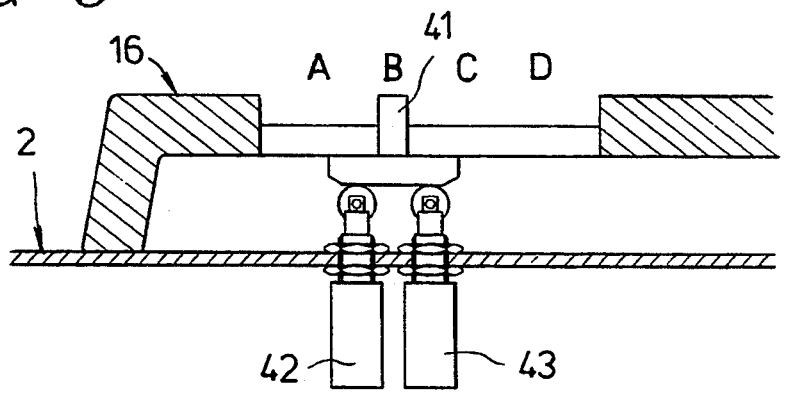
FIG. 9 is another illustrative view of the flour kind discriminating unit, particularly showing that the kind of flour used at present is indicated.
Figure 10:
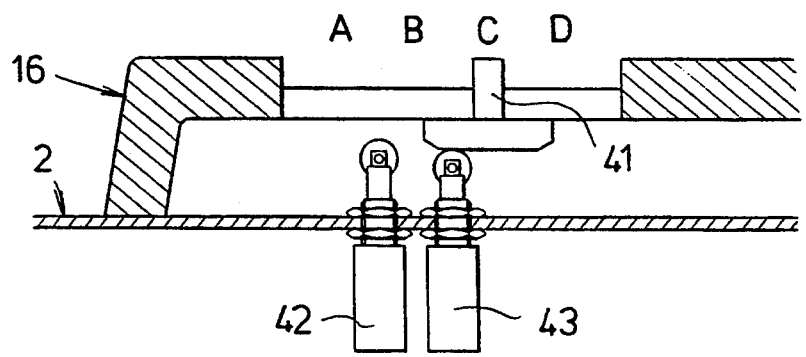
FIG. 10 is another illustrative view of the flour kind discriminating unit, particularly showing that the kind of flour used at present is indicated.
Figure 11:
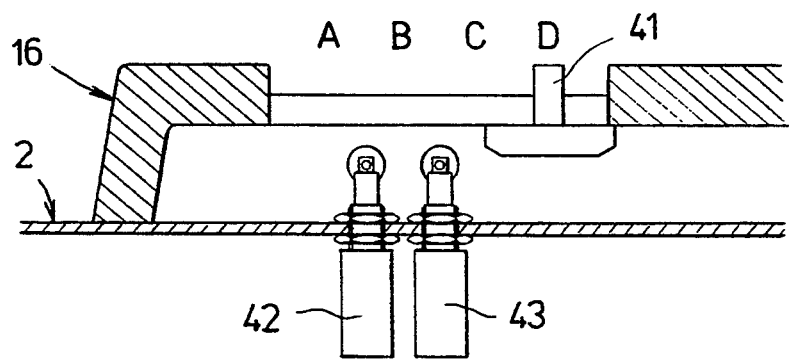
FIG. 11 is another illustrative view of the flour kind discriminating unit, particularly showing that the kind of flour used at present is indicated.
Figure 12:
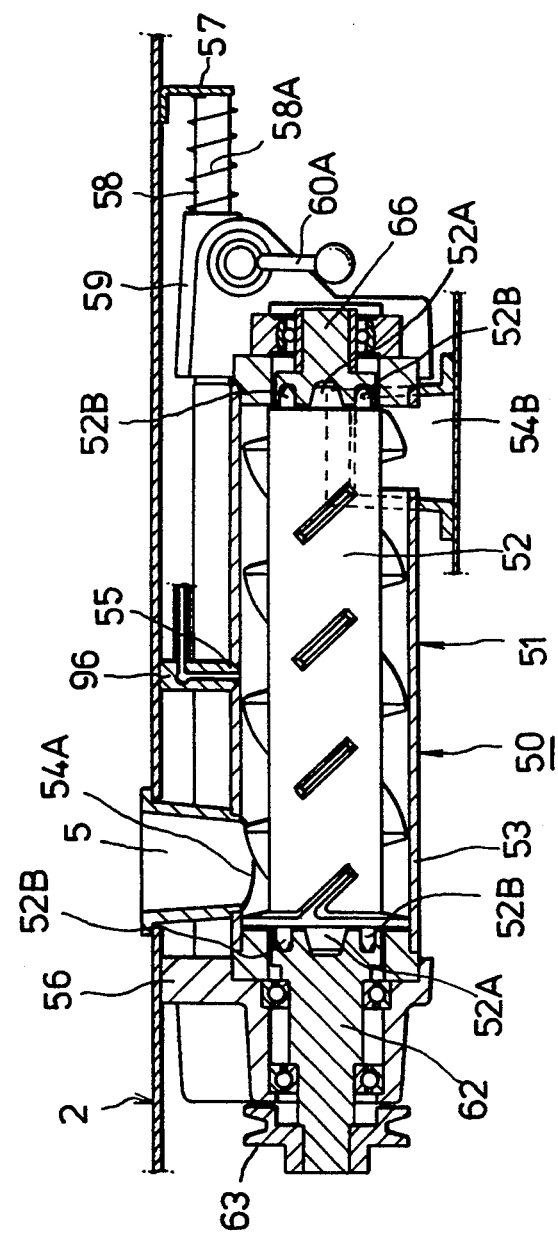
FIG. 12 is a sectional front view of a mixer in a flour kneading unit, particularly showing the mixer as arranged in the flour kneading unit.

As shown in FIG. 8, when the flour kind selecting lever 41 is located at the display mark A, only the first microswitch 42 is shifted to ON so that the unit 40 determines and indicates that the kind of flour which is used at present belong to an A kind. As shown in FIG. 9, when the flour kind selecting lever 41 is located at the display mark B, both the first and second microswitches 42 and 43 are simultaneously shifted to ON so that the unit 40 determines and indicates that the kind of flour which is used at present belongs to a B kind. As shown in FIG. 10, when the flour kind selecting lever 41 is located at the display mark C, only the second microswitch 43 is shifted to ON so that the unit 40 determines and indicates that the kind of flour which is used at present belongs to a kind C. Further, as shown in FIG. 11, when the flour kind selecting lever 41 is located at the display mark D, both the first and second microswitches 42 and 43 are shifted to OFF so that the unit 41 determines and indicates that the kind of flour which is used at present belongs to a D kind. With this construction, the unit 41 can control a system for driving the quantitative flour feeding unit 10, the flour kneading unit 50 and a noodle base milling unit 70 to be described later in accordance with a program prepared for the respective flour kinds A, B, C and As shown in FIG. 12, the flour kneading unit 50 includes a mixer 51 for preparing a scrambled egg-shaped noodle base by kneading the flour P fed from the quantitative flour feeding unit 10 in the presence of kneading water W. The mixer 51 includes a kneading member 52 and a cylinder 53 as essential components, and the kneading member 52 is rotatably received in the cylinder 53 while extending in the axial direction in such a manner that it can be disassembled seperately from the cylinder 53.

A flour infeed port 54A, a kneading water infeed port 55 and a noodle base outfeed port 54B are formed on the cylinder 53 so that flour P and kneading water W are fed in the space defined between the kneading member 52 and the cylinder 53. The flour infeed port 54A communicates with the chute 5 through which a predetermined quantity of flour P is fed from the quantitative flour feeding unit 10 via the flour outfeed port 17. The kneading water infeed port 55 communicates with a kneading water ejecting nozzle 96 which is connected to a kneading water feeding unit 92 to be described later. Further, the noodle base outfeed port 54B communicates with a noodle base storing section 71 of a noodle base milling unit 70 to be described later.

Figure 13:
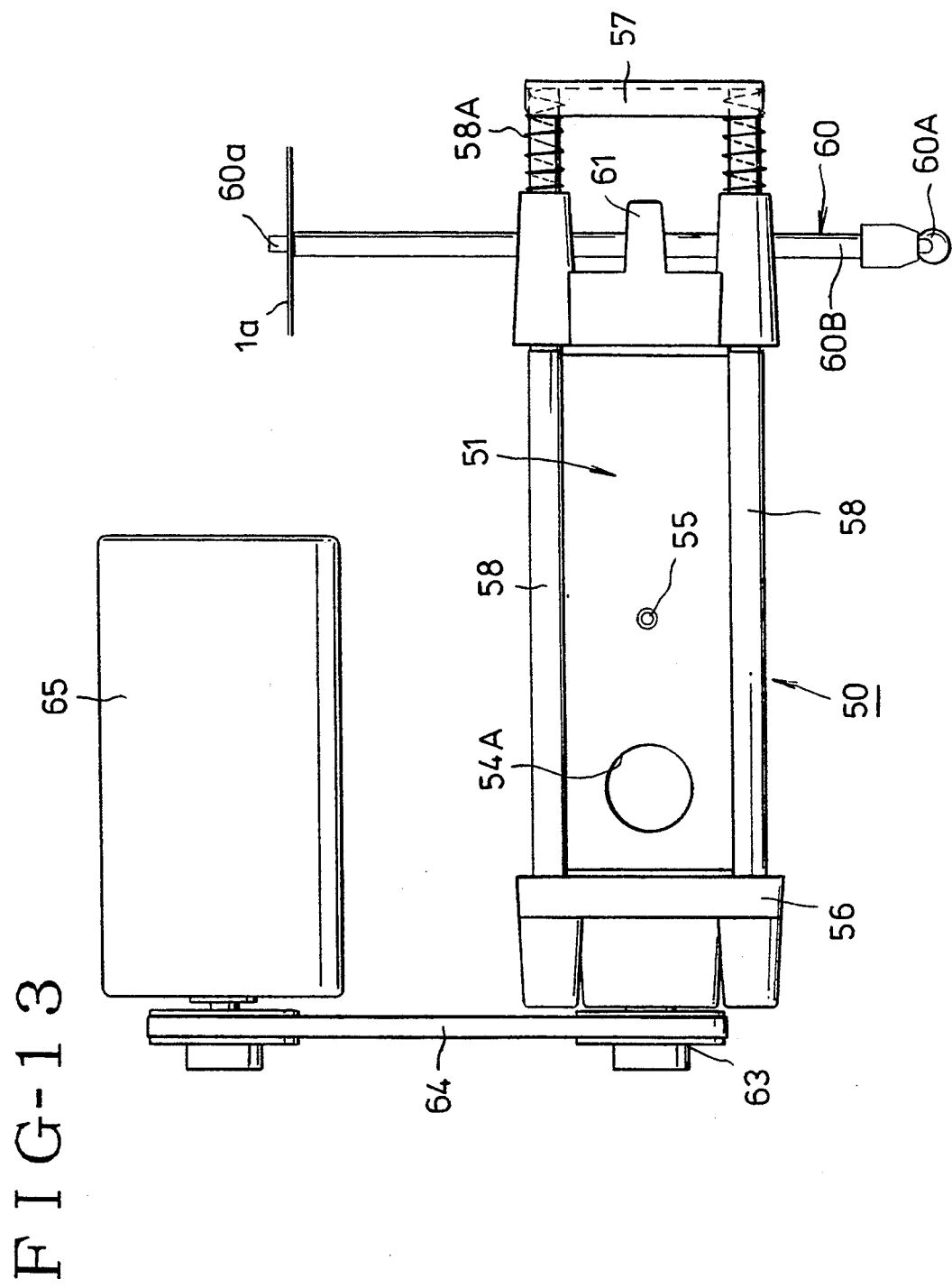
FIG. 13 is a plan view of the flour kneading unit, particularly showing the mixer as arranged in the flour kneading unit.

As shown in FIG. 13, the mixer 51 is arranged between a stationary support arm 56 and a bracket 57 both of which are located opposite to each other below the ceiling plate 2 of the housing 1. In addition, a pair of guide rails 58 are arranged between the stationary support arm 56 and the bracket 57 while extending in parallel with each other in the axial direction, i.e., in the leftward/rightward direction relative to the forward-/rearward direction of the housing 1.

A movable support arm 59 normally biased toward the stationary support arm 56 side with the aid of coil springs 58A disposed between the bracket 57 and the movable support arm 59 is slidably supported by the guide rails 58. A turn rod 60 of which one end 60a is pivotally supported on a stationary frame la of the housing 1 is inserted through the movable support arm 59 directly below the guide rails 58 while extending through an eccentric collar 61 at a right angle relative to the guide rails 58. With this construction, the movable arm 59 can be held in the locked state by turning an actuation knob 60A disposed at the other end 60b of the turn rod 60 so as to slightly raise up the turn rod 60 with the aid of the eccentric collar 61 and bring the turn rod 60 in contact with the guide rails 58.

Taper shafts 52A are projected outward of the opposite ends of the kneading member 52 constituting the mixer 51 for the purpose of position determination while extending along the center axis of the kneading member 52, and moreover, at least one taper pin 52B (two taper pins in the shown embodiment) is likewise projected outward of the opposite ends of the kneading member 52 for the purpose of power transmission at the position radially offset from that of each taper shaft 52A.

On the other hand, a driving rotary member 62 is rotatably supported in the stationary support arm 56 so that it is rotationally driven by a second driving motor 65 via a pulley 63 and a V-shaped endless belt 64. In addition, a driven rotary member 66 is rotatably supported in the movable support arm 59 at the position located opposite to the driving rotary member 62 while extending along the center axis of the kneading member 52.

Figure 14:
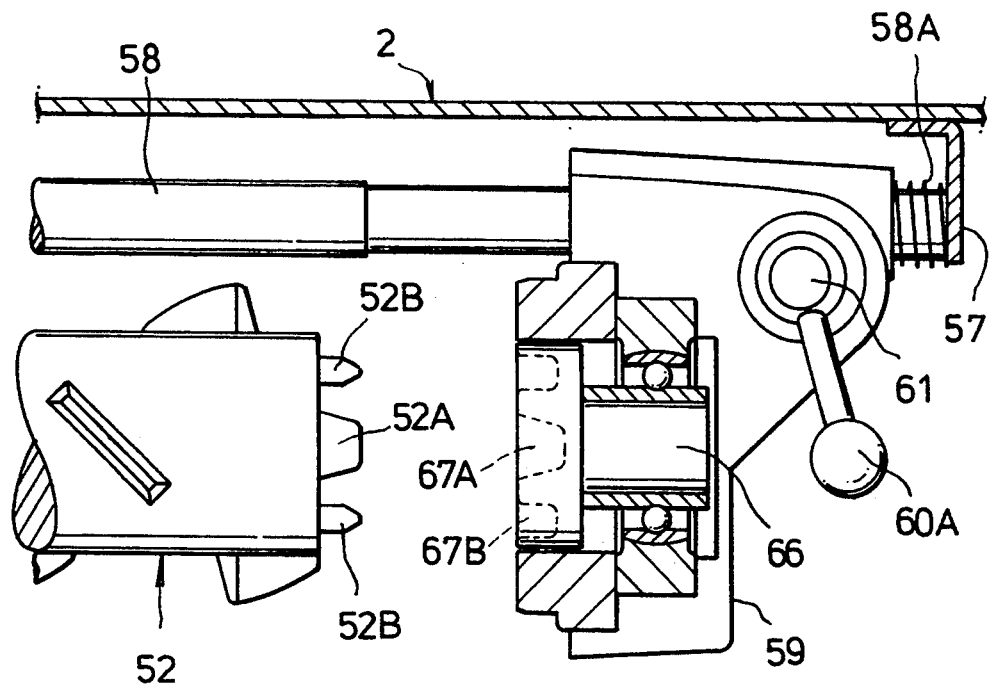
FIG. 14 is a fragmentary enlarged illustrative view of the flour kneading unit, particularly showing how the mixer is arranged in the flour kneading unit.
Figure 15:
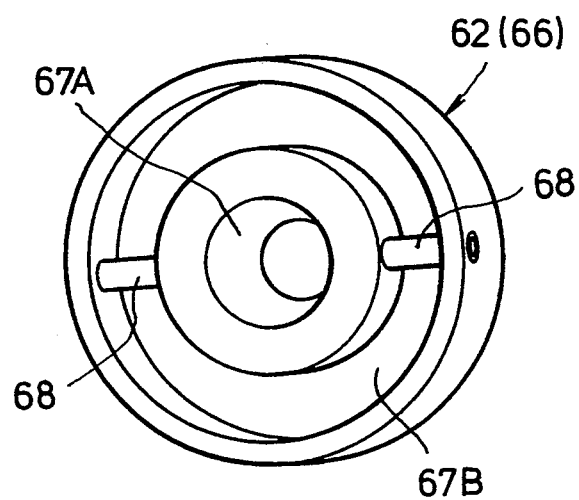
FIG. 15 is a perspective view of a support arm fitting portion of the flour kneading unit.

As shown in FIG. 14 and FIG. 15, a taper hole 67A and an annular engagement groove 67B are formed in each of the driving rotary member 62 and the driven rotary member 66 rotatably supported in the stationary support arm 56 and the movable support arm 59 so that the taper shaft 52A is fitted into the taper hole 67A and the taper pins 52B are engaged with the annular engagement groove 67B. As is best seen in FIG. 15, an opposing pair of spring pins 68 each serving as a stopper adapted to be engaged with the taper pins 52B in the circumferential direction are disposed in the annular engagement groove 67B.

When the mixer 51 is to be arranged in the housing 1, first, the taper shafts 52A projecting outward of the opposite ends of the kneading member 52 along the center axis of the mixer 51 are fitted into the taper holes 67A formed in the driving rotary member 62 and the driven rotary member 66 rotatably held by the stationary support arm 56 and the movable support arm 59 so as to determine the position to be assumed by the mixer 51, while the taper pins 52B likewise projecting outward of the opposite ends of the kneading member 52 are brought in engagement with the annular engagement groove 67B via the spring pins 68 so as to enable the rotational force of the second driving motor 65 to be transmitted to the mixer 51. The opposite ends of the cylinder 53 are detachably supported by the stationary support arm 56 and the movable support arm 59.

While the foregoing positional state is maintained, the turn rod 60 is actuated to displace the movable support arm 59 toward the stationary support arm 56 side in the forward direction until the movable support arm 59 is held in the locked state. Thus, the mixer 51 is operatively supported by the stationary support arm 56 and the movable support arm 59 in the clamped state therebetween by the biasing force given by the coil springs 58A.

Figure 16:
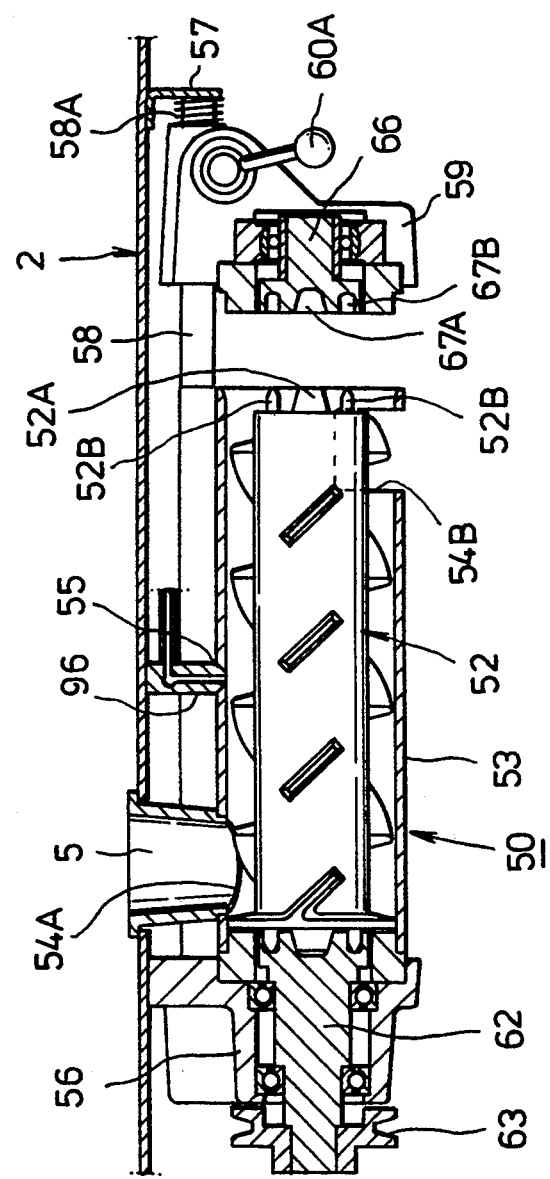
FIG. 16 is a sectional front view of the mixer in the flour kneading unit, particularly showing the mixer disassembled from the flour kneading unit.

When the mixer 51 is to be removed from the flour kneading unit 50, the actuation knob 60A of the turn rod 60 is turned in a certain direction to release the turn rod 60 from the locked state, and the turn rod 60 is then displaced in the rearward direction with the one end 60a of the turn rod 60 as a fulcrum, as shown in FIG. 13. Thus, the movable support arm 59 is slidably displaced along the slide rails 58 against the biasing force given by the coil springs 58A until it is parted away from the one end of the mixer 51, as shown in FIG. 16.

Figure 17:
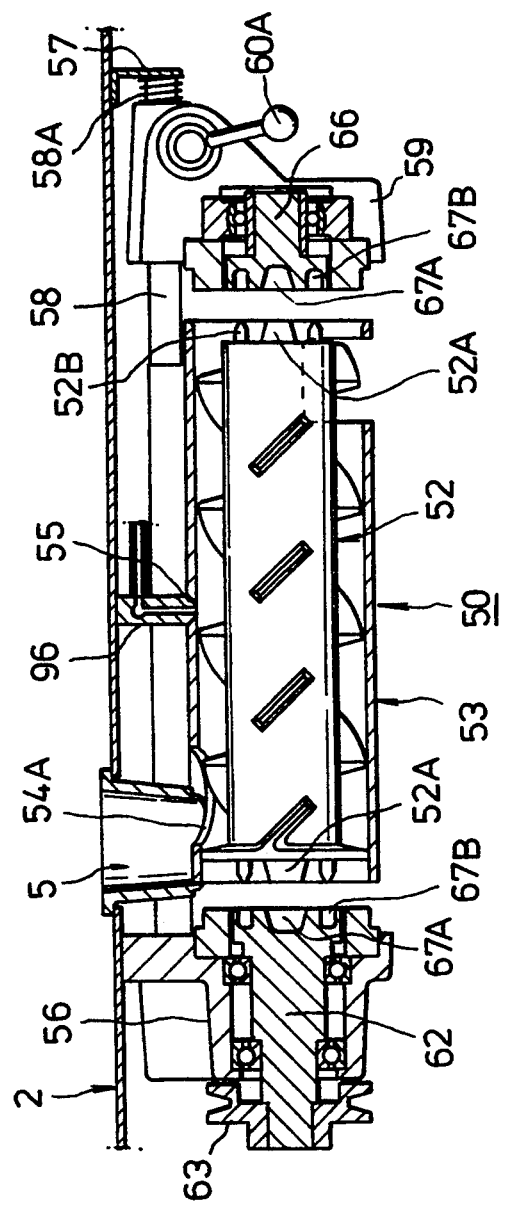
FIG. 17 is another sectional front view of the mixer in the flour kneading unit, particularly showing the mixer disassembled from the flour kneading unit.
Figure 18:
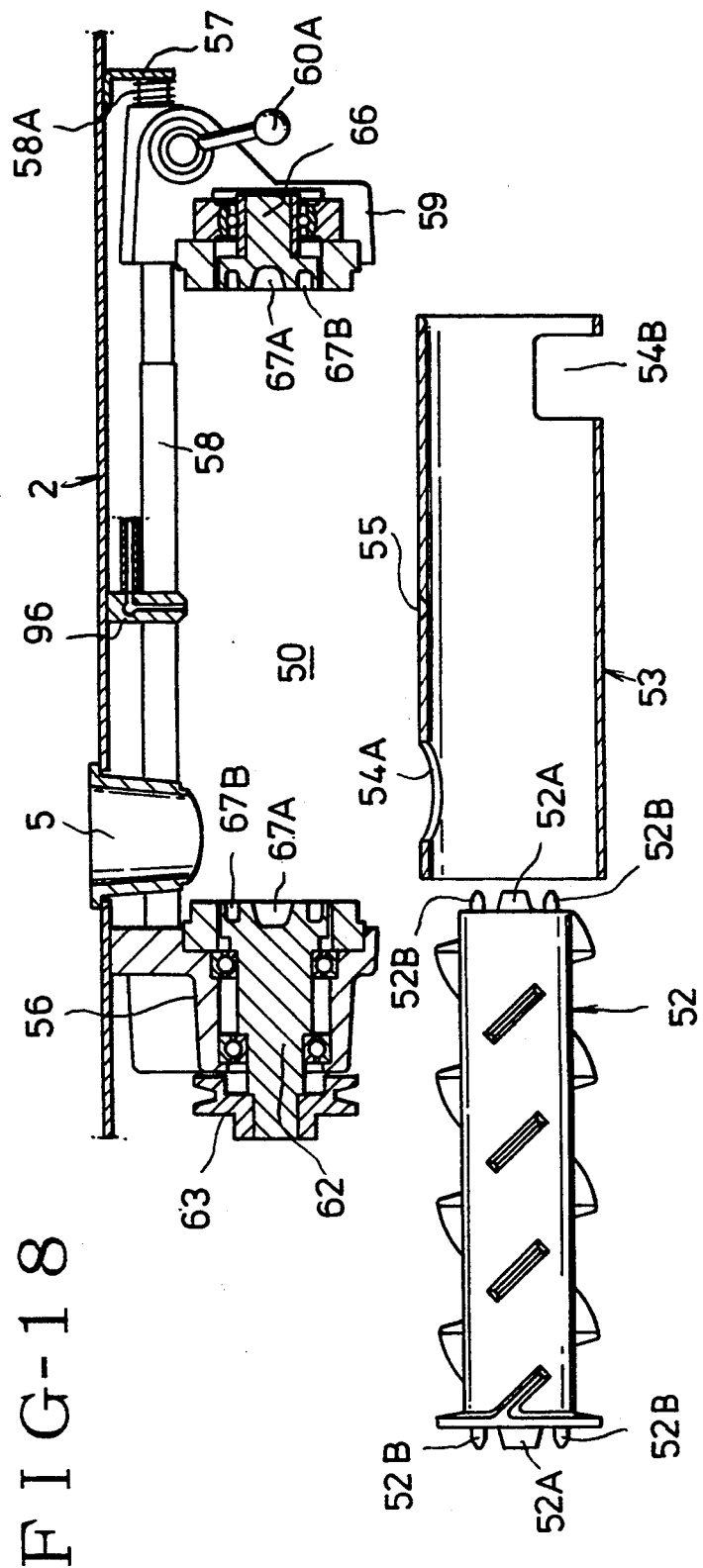
FIG. 18 is an illustrative view of the flour kneading unit, particularly showing the mixer completely disassembled from the flour kneading unit.

Subsequently, while the mixer 51 is seized with operator's hands, it is displaced in the rearward direction until the other end of the mixer 51 is parted away from the stationary support arm 56, as shown in FIG. 17. As shown in FIG. 18, the mixer 51 can now be disassembled from the flour kneading unit 50, and moreover, the kneading member 52 can easily be drawn out of the cylinder 53. Therefore, replacement of the mixer 51 with another one as well as cleaning of the mixer 51 can be achieved simply and easily.

After a scrambled egg-shaped noodle base is prepared in the flour kneading unit 50, it is taken out of the noodle base outfeed port 54B and then delivered to the noodle base storing section 71 of the noodle base milling unit 70 located below the flour kneading unit 50.

Figure 19:
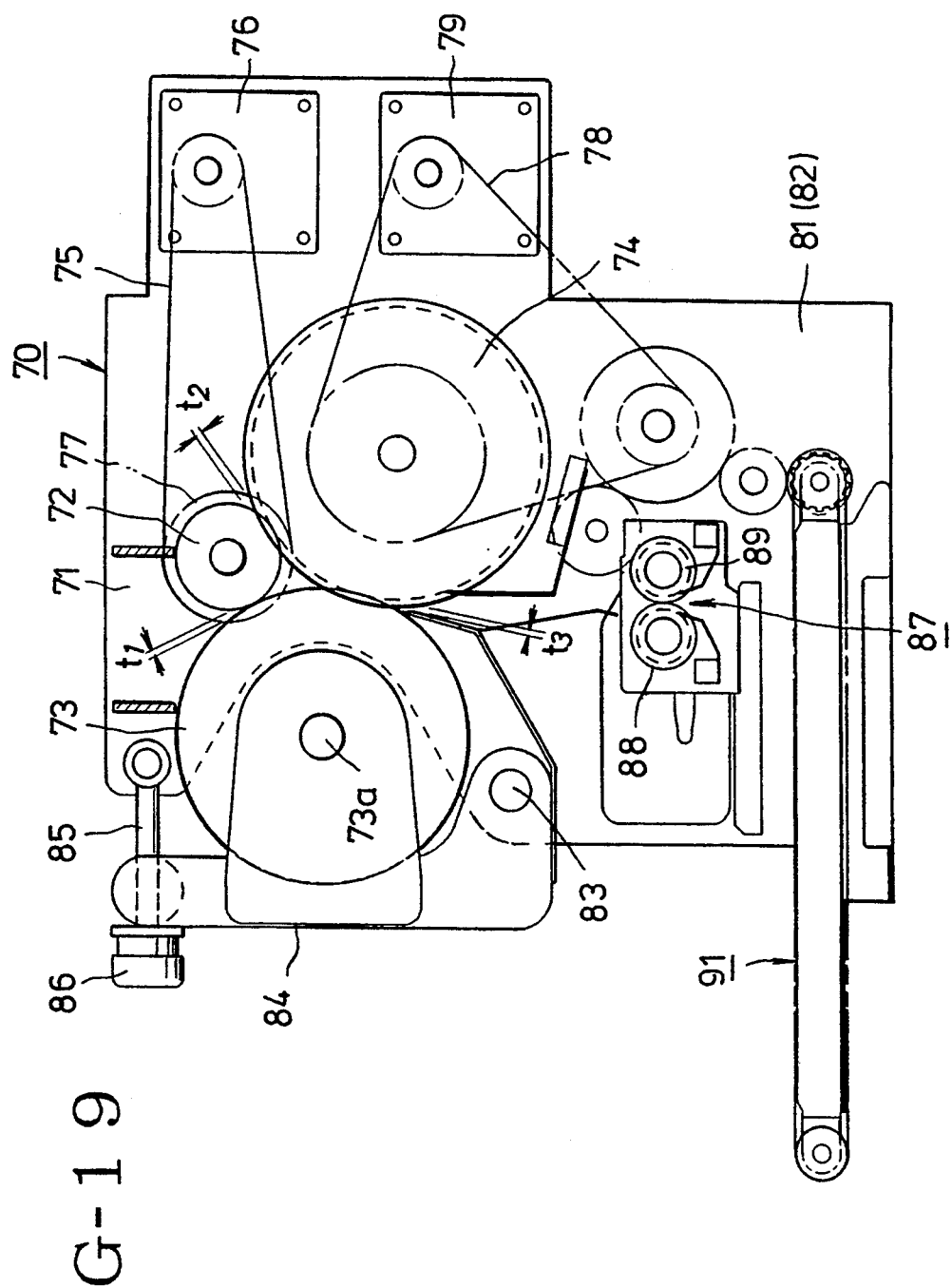
FIG. 19 is a vertical sectional side view of a noodle base milling unit, particularly showing essential components forming the noodle base milling unit.

As shown in FIG. 19, a first milling roller 72 and a second milling roller 73 each of which is made of a metallic material, e.g., iron or stainless steel and each of which surface is hardened by employing a plasma nitriding process are arranged in the face-to-face relationship below the noodle base storing section 71 of the noodle base milling unit 70 while a gap $t_1$ is kept therebetween. In addition, a third milling roller 74 made in the same manner as the first milling roller 72 and the second milling roller 73 is arranged below the first milling roller 72 and the second milling roller 73 while a gap $t_2$ is kept between the first milling roller 72 and the third milling roller 74 and a gap $t_3$ is kept between the second milling roller 73 and the third milling roller 74.

The first milling roller 72 and the third milling roller 74 are rotatably supported between support frames 81 and 82 which are fixedly arranged in the housing 1. The first milling roller 72 is rotationally driven by a third driving motor 76 via an endless chain belt 75 while the first milling roller 72 and the second milling roller 73 mesh with each other via Gears 77 so as to allow them to be rotated in synchronization with each other. On the other hand, the third milling roller 74 is rotationally driven by a fourth driving motor 79 via an endless chain belt 78 independently of the first milling roller 72. With this construction, the first milling roller 72, the second milling roller and the third milling roller 74 are rotated at the substantially same circumferential speed.

A support shaft 73a for the second milling roller 73 is rotatably supported between both the support frames 81 and 82 by a pair of turnable support arms 84 adapted to turn about a shaft 83 in the forward/rearward direction, i.e., in such a direction that the second milling roller 73 is displaced toward or away from the first milling roller 72 and the third milling roller 74.

Figure 20:
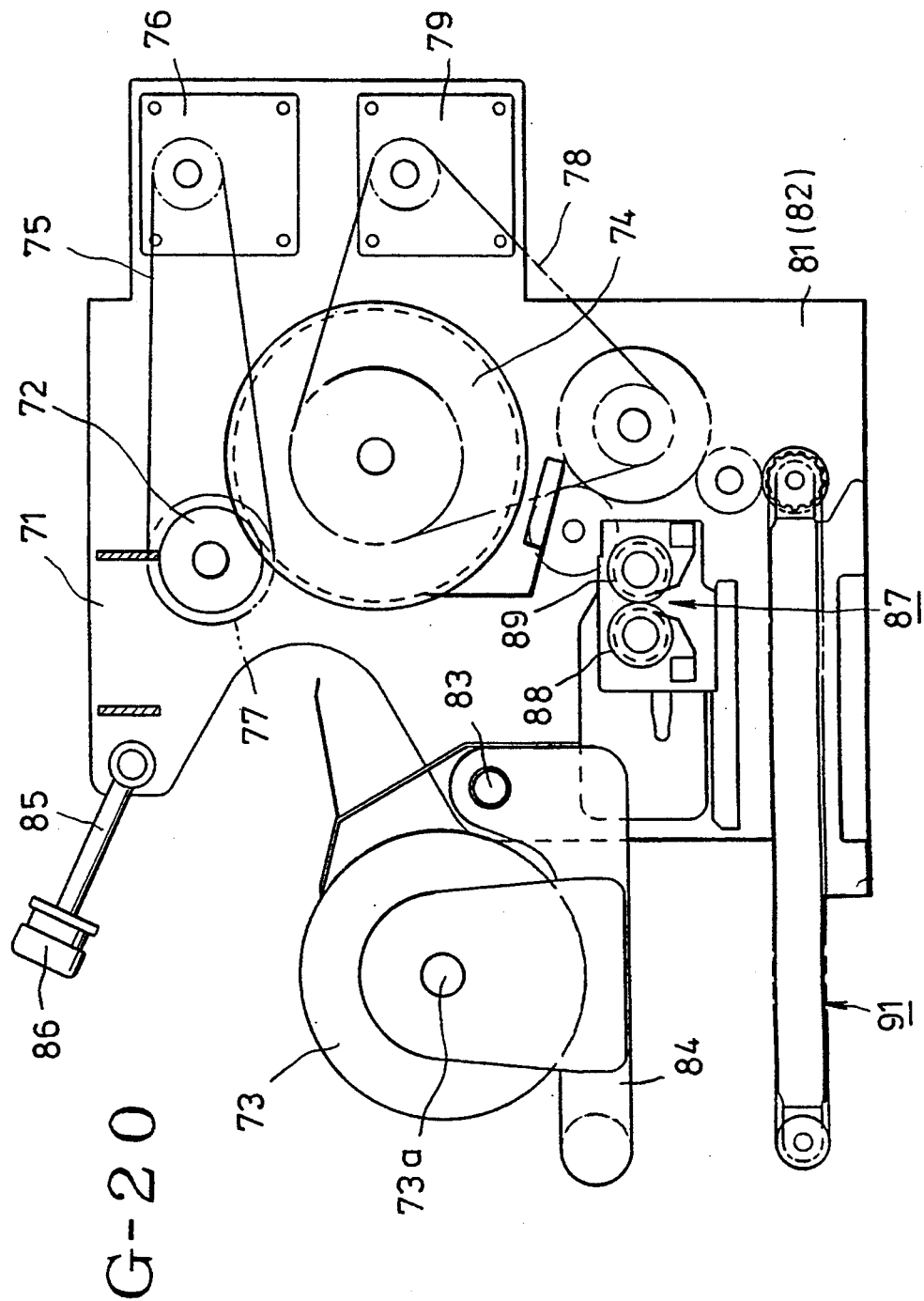
FIG. 20 is an illustrative view of the noodle base milling unit, particularly showing a second milling roller displaced away from a first milling roller and a third milling roller.

In FIG. 19 and FIG. 20, reference numeral 85 designates an opening/closing lever which serves to support the turnable support arms 84. As shown in FIG. 20, when the opening/closing lever 85 is turned in the upward direction, the turnable support arms 84 are released from the supported state. Subsequently, as an adjustment dial 86 serving also as a stopper threadably fitted onto the fore end part of the opening/closing lever 85 is adjustably rotated, the turnable support arms 84 are turned in the forward/rearward direction, whereby the gap $t_1$ between the first milling roller 72 and the second milling roller 73 as well as the gap $t_3$ between the second milling roller 73 and the third milling roller 74 can be adjusted finely within the range of 1 to 3 mm so as to adjust the thickness of a product of ribbon-shaped or band-shaped noodle.

At this time, the gap $t_2$ between the first milling roller 72 and the third milling roller 74 is kept unchangeable to such an extent that they do not contact with each other, while the gap $t_1$ between the first milling roller 72 and the second milling roller 73 is set to be equal to or appreciably larger than the gap $t_3$ between the second milling roller 73 and the fourth milling roller 74.

In operation, when a predetermined quantity of scrambled egg-shaped noodle base prepared in the flour kneading unit 50 is accumulatively stored in the noodle base storing section 71 of the noodle base milling unit 70, it is rolled in the space between the first milling roller 72 and the second milling roller 73 by its own dead weight to prepare noodle band as both the milling rollers 72 and 73 are rotated. After completion of the first milling step, the noodle band is conducted to the upstream side of the space between the second milling roller 73 and the third milling roller 74.

At this time, the gap $t_3$ is kept between the second milling roller 73 and the third milling roller 74. When the third milling roller 74 is not rotated, i.e., it is kept stopped, the noodle band is successively squeezed on the upstream side of the space between the second milling roller 73 and the third milling roller 74 without any passage of the noodle band therebetween, whereby it is accumulatively filled on the upstream side of the foregoing space in the folded state while it is pressurized.

Subsequently, rotation of the third milling roller 74 is started with some delay when it is detected that the noodle band is adequately accumulated on the upstream side of the space between the second milling roller 73 and the third milling roller 74 in the pressurized state. As the second milling roller 73 is rotated, the noodle band is rolled in the space between the second milling roller 73 and the third milling roller 74 so that another noodle band is prepared during second milling step. On completion of the second milling step, a product of noodle band is delivered to a noodle band cutting unit 87 arranged on the downstream side of the noodle base milling unit 70.

As is apparent from the above description, after the noodle base is subjected to first milling between the first milling roller 72 and the second milling roller 73, a product of noodle band is once accumulatively stored on the upstream side of the space between the second milling roller 73 and the third milling roller 74 in the folded state when the third milling roller 74 is not rotated. Subsequently, when the noodle band is subjected to second milling between the second milling roller 73 and the third milling roller 74 under a condition that the delayed time of rotation of the third milling roller 74 delayed from the time of rotation of the first milling roller 72 and the second milling roller 73 is properly adjusted, the same kneading effect as that attainable with a composite noodle producing process wherein two kinds of noodle bands are milled in the overlapped state can be obtained with the noodle band which has been subjected to secondary milling. The thus obtained noodle band is preferably usable as a noodle such as "wheat vermicelli", "Chinese vermicelli" or the like of which foodstuff toughness is significantly taken into account. Since the noodle having high foodstuff toughness as mentioned above is hardly elongated when it is Cooked in boiled water, it is practically possible to preliminarily cook a considerably large quantity of noodle in boiled water in consideration of the prospective frequency of customer's requests or order.

Otherwise, when rotation of the third milling roller 74 is started at the time earlier than the aforementioned delayed time, noodle band milled in the space between the first milling roller 72 and the second milling roller 73 is twice milled in the downstream space between the second milling roller 73 and the third milling roller 74 as its is. The thus prepared noodle band which has been kneaded to small extent is preferably usable as a noodle such as "buck-wheat vermicelli" or the like. In addition, since this kind of noodle is pressurized relatively little and contains many voids, it can cooked in boiled water for a short time.

The noodle band cutting unit 87 is composed of an opposing pair of cutting rollers 88 and 89, and the noodle band milled in the noodle base milling unit 70 is delivered to the space between the cutting rollers 88 and 89 so as to cut the noodle band to a plurality of ribbon-shaped noodles. After completion of the cutting operation, the ribbon-shaped noodles are caused to fall down on a chain conveyor 91 which in turn conveys the ribbon-shaped noodles to an outlet port (not shown) formed on the front surface side of the housing 1. It should be noted t hat driving of the cutting rollers 88 and 89 in the noodle band cutting unit 87 as well as driving of the chain conveyor 91 serving as ribbon-shaped noodle conveying means are simultaneously achieved by the fourth driving motor 79 for driving the third milling roller 74 in the noodle base milling unit 70.

In FIG. 2, reference numeral 92 designates a kneading water feeding unit for feeding knead water W to the mixer 51. The kneading water feeding unit 92 feeds kneading water W received in a water tank 93 the kneading water ejecting nozzle 96 with the aid of a pump 94 and a flow rate regulator 95 wherein the kneading water ejecting nozzle 96 is oriented toward the mixer 51 of the flour kneading unit 50.

In addition, in the drawing, numeral 100 designates an accommodating space which is located at the lower part of the housing 1. A controlling unit (not shown) for the quantitative flour feeding unit 10 is accommodated in the accommodating space 100.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A noodle making machine comprising:
   a housing,
   a quantitative flour feeding unit removably mounted on the housing comprising:
      a hopper,
      a rotational driving mechanism for stirring the flour stored in the hopper,
      a support platform on which said hopper and said rotational driving mechanism are mounted,
      position determining means for removably mounting said flour feeding unit on said housing including a V-shaped guide groove formed on said support platform and a locating pin projecting from said housing to fit in said guide groove;
   a flour kneading unit including a mixer for preparing a noodle base by kneading the flour fed from said quantitative flour feeding unit with a liquid,
   a noodle base rolling unit for rolling the noodle base to prepare a noodle band, and
   a noodle band cutting unit including an opposing pair of cutting rollers for cutting the noodle band into a plurality of ribbon-shaped noodles.

2. A noodle making machine according to claim 1, wherein said machine further comprises a driving motor mounted on said housing, and means for transmitting power from said driving motor to said rotational driving mechanism of said flour feeding unit.

3. A noodle making machine as in claim 1 further comprising means for fastening said support platform to said housing.

4. A noodle making machine as in claim 3 wherein said guide groove and locating pin and said further fastening means are located spaced from each other diametric of the hopper.

5. A noodle making machine as in claim 3 wherein said further fastening means comprises a projecting threaded member on one of said support platform and housing, and a mating threaded hole on the other.

6. A noodle making machine as in claim 4 wherein said further fastening means comprises a projecting threaded member on one of said support platform and housing, and a mating threaded hole on the other.

* * * * *